No. 707,299. Patented Aug. 19, 1902.
C. A. CHASE.
MACHINE FOR MOLDING INCANDESCENT LAMP SOCKETS.
(Application filed Mar. 20, 1902.)
(No Model.) 2 Sheets—Sheet 2.
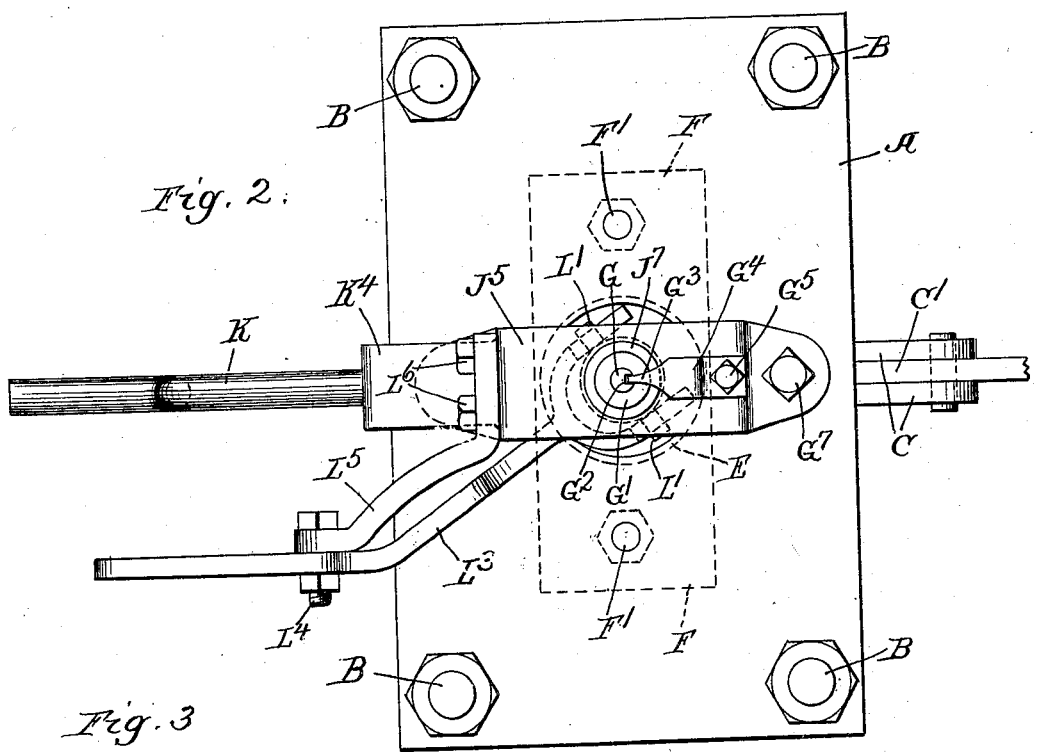
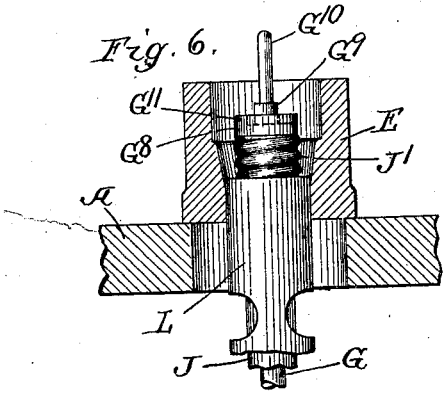
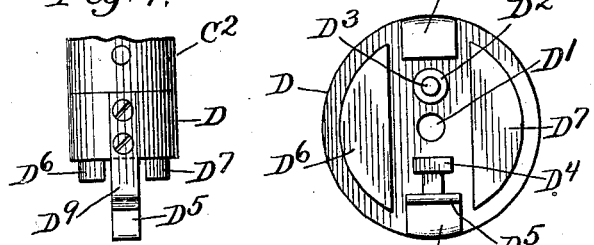
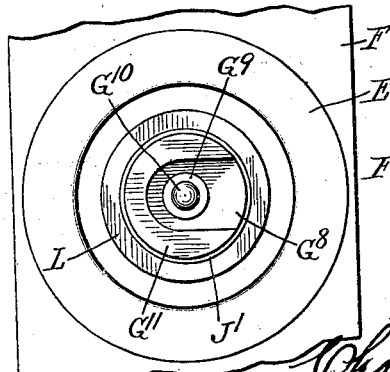

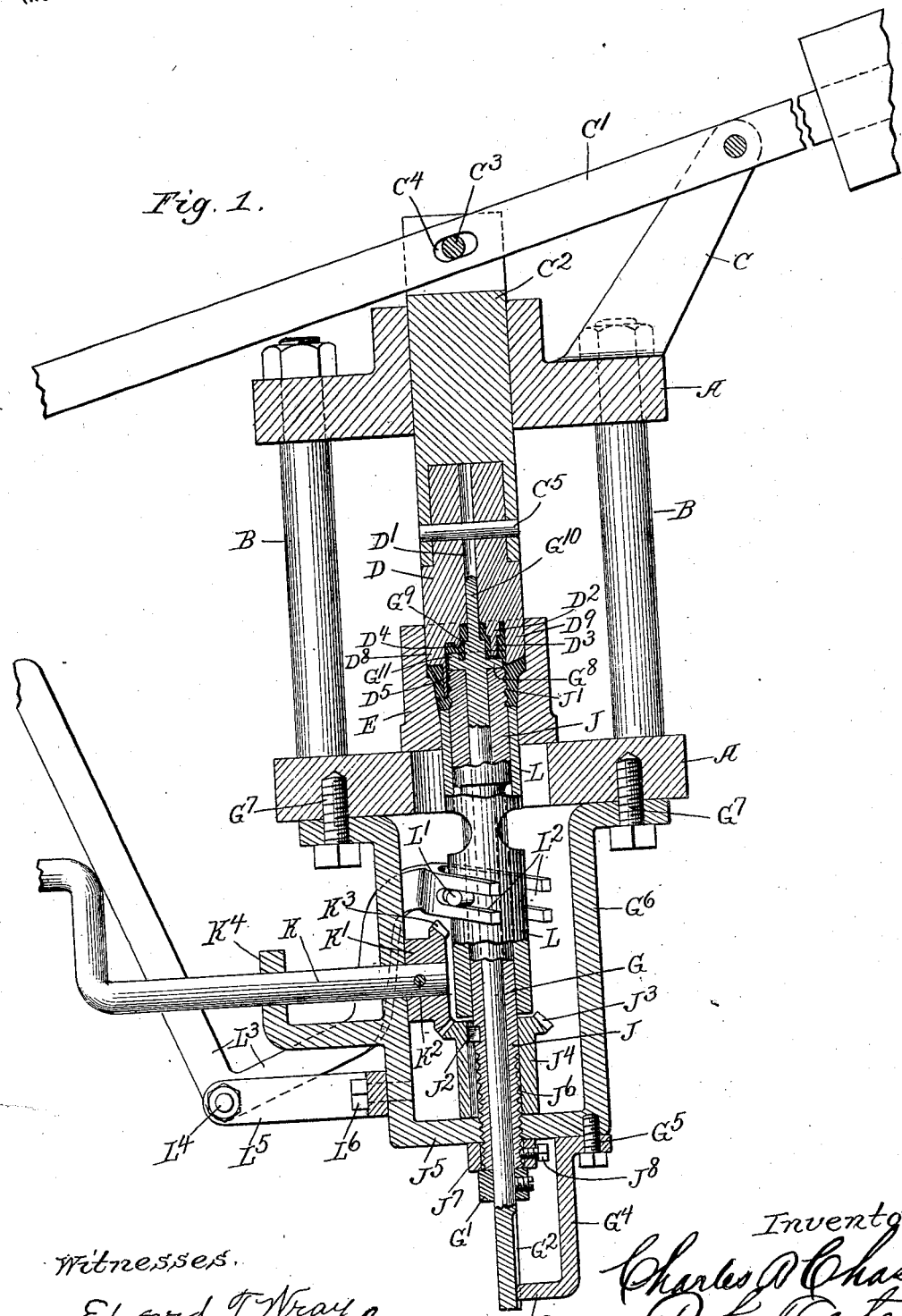

UNITED STATES PATENT OFFICE.

CHARLES A. CHASE, OF CHICAGO, ILLINOIS.

MACHINE FOR MOLDING INCANDESCENT-LAMP SOCKETS.

SPECIFICATION forming part of Letters Patent No. 707,299, dated August 19, 1902.

Application filed March 20, 1902. Serial No. 99,125. (No model.)

*To all whom it may concern:*

Be it known that I, CHARLES A. CHASE, a citizen of the United States, residing at Chicago, in the county of Cook and State of Illinois, have invented a certain new and useful Improvement in Machines for Molding Incandescent-Lamp Sockets, of which the following is a specification.

My invention relates to a machine for molding incandescent-lamp sockets, and has for its object to provide certain improvements in such a machine, as will be hereinafter described.

Figure 1 is a vertical section. Fig. 2 is an inverted plan of the lower plate with parts shown in dotted lines. Fig. 3 is a detail side view of the upper die. Fig. 4 is an elevation of same looking in the direction of the arrow in Fig. 3. Fig. 5 is an inverted plan view of the same. Fig. 6 is a detail cross-section of the lower die. Fig. 7 is a plan view of the same.

Like parts are indicated by the same letter in all the figures.

A A are frame-plates joined by the standards B B to hold the several parts in proper relation to each other.

C is an arm rising from the upper plate, on which is pivoted the lever $C'$, which lever is part of the operating mechanism and is operated in any desired manner to raise and lower the plunger $C^2$, which is guided in the upper plate A and provided with the pin $C^3$ to engage the slot $C^4$ in the lever $C'$. To this plunger is secured—for example, by the pin $C^5$—the body D of the upper die. This body D is provided with the central hole $D'$, the downwardly-projecting pin-like part $D^2$, with the tip $D^3$ thereon, the downwardly-projecting part $D^4$, and the downwardly-projecting part $D^5$.

$D^6$ and $D^7$ are downwardly-projecting parts. $D^8$ and $D^9$ are also downwardly-projecting portions. The projection $D^5$ is an extension of projection $D^8$.

The mold proper is formed by the body E, supported on the flange F, which is bolted at $F'$ $F'$ to the plate A. The lower die is composed of several portions.

G is a central rod-like part carrying at its lower end the collar $G'$ and having the groove $G^2$ to receive the finger $G^3$ on the bar $G^4$, which is secured at $G^5$ to the downwardly-projecting yoke or pocket $G^6$, attached at $G^7$ $G^7$ to the plate A. This rod carries at its upper end the plate $G^8$, with the enlarged portion $G^9$ and the upwardly-projecting part $G^{10}$ and also the upwardly-projecting part $G^{11}$. It is surrounded by the cylinder J, having the corrugations $J'$ and keyed at $J^2$ to the bevel-gear $J^3$, which gear is formed on the hub $J^4$ and rests on the lower end $J^5$ of the yoke or pocket $G^6$. The cylinder J is screw-threaded at $J^6$ and provided with the stop-collar $J^7$, fixed by the set-screw $J^8$. Thus the rod G and the cylinder J move together vertically, but rotate one upon the other.

K is a crank-shaft carrying the hub $K'$, secured to it by the pin $K^2$, and on the outer edge of the hub is the bevel-gear $K^3$ to engage the gear $J^3$ and drive the same. The shaft K is supported in bearings in the side of the yoke $G^6$ and in the arm $K^4$. A sleeve L surrounds the cylinder J and is provided with laterally-projecting lugs $L'$ $L'$ to engage the slots $L^2$ $L^2$ in the bifurcated end of the elbow crank-lever $L^3$, which is pivoted at $L^4$ to the arm $L^5$, secured at $L^6$ in the yoke.

I have shown the particular form of dies which I employ in the manufacture of my peculiar socket; but it is obvious that these die forms may vary somewhat from that which is above shown. I do not, therefore, wish to be limited to the precise form, construction, and arrangement of the parts which I have shown. The upper die, broadly speaking, consists of a portion which descends into the mold, in this case the bottom of the socket, and which is adapted to receive the upwardly-moving portion of the lower die, which is intended to form the top of the socket. The lower die comprises movable parts, particularly two parts, which reciprocate together, but rotate one on the other. It may also and in this case does have a third part, which reciprocates on the other parts.

The use and operation of my invention are as follows: With a device constructed substantially as shown the several parts will be arranged and adjusted so that when brought together into position for forming the molded article, as shown in Fig. 1, they will take their proper relative positions. The lower die is now brought up into the position shown, and the cavity formed within the mold around its upper end may be filled with any proper material, when the upper die may be brought down upon the lower until the parts are in the position indicated in Fig. 1. Here the molding process takes place. The first thing to do is then to raise the upper die, thus exposing the uppermost portion of the finished socket. By now turning the crank K the cylinder J will be rotated by means of the gears, and since its exterior surface is screw-threaded it will begin to travel. The parts are so related that it will travel downwardly in such a way as to screw the corrugated screw-threaded portion J' out of the socket, the cylinder J rotating and moving downwardly at the same time. The same motion of course draws down the rod G, with all its accompanying projecting irregular upper surfaces. It does not rotate, because of the engagement of the finger G³ with the groove G⁴, and hence it is drawn away directly from engagement with the parts which it has assisted in forming. By operating the elbow crank-lever L³ the sleeve L may be raised and the finished socket thus be lifted out of the mold, where it may be removed by the attendant. It will be observed in following this procedure that the arrangement of parts is such that when operated the following process is carried out: Assume, first, that the socket has been molded. The first step is to rotate and withdraw at the same time that portion of the mold which has the screw-threaded corrugation on it. In the second place, preferably simultaneously therewith, that portion of the mold which has two irregular surfaces is withdrawn, but not rotated. In the third place the upper mold is lifted out of the way, although this step might be taken at any other point in the process. This, of course, is not rotated where its lower surface is broken up into such irregularities as those shown. The last step is to lift the finished product out of the mold.

Broadly speaking, my invention contains, among other things, what I have called a "mold-shell" and "dies," at least one of them a duplex die, and devices for reciprocating and rotating the portions of such duplex die one on the other.

I claim—

1. In a machine for molding incandescent-lamp sockets, the combination of a mold-shell with two dies which approach each other within the shell, one of said dies duplex and containing parts one of which reciprocates and rotates while the other reciprocates but does not rotate.

2. In a machine for molding incandescent-lamp sockets, the combination of a mold-shell with two dies which approach each other within the shell, one of said dies duplex and containing parts one of which reciprocates and rotates, while the other reciprocates but does not rotate; the other of said dies adapted to reciprocate but not rotate.

3. In a machine for molding incandescent-lamp sockets, the combination of a mold-shell with two dies which approach each other within the shell, one of said dies duplex and containing parts one of which reciprocates and rotates while the other reciprocates but does not rotate, and an additional die-piece which forces the finished product out of the mold.

4. In a machine for molding incandescent-lamp sockets, the combination of a mold-shell with two dies which approach each other within the shell, one of said dies duplex and containing parts one of which reciprocates and rotates while the other reciprocates but does not rotate, and one of which forces the finished product out of the mold, and an opposed die which reciprocates but does not rotate.

5. In a machine for molding incandescent-lamp sockets a die having three parts, concentric with each other, the intermediate part adapted to rotate while it reciprocates, the other parts adapted to reciprocate only.

6. In a machine for molding incandescent-lamp sockets a die having three parts, concentric with each other, the intermediate part adapted to rotate while it reciprocates, the other parts adapted to reciprocate only, and an opposed die-surface which reciprocates only.

7. In a machine for molding incandescent-lamp sockets a mold-shell with dies to form the socket within the mold-shell, and means for withdrawing both of said dies and a die portion adapted to be reciprocated to remove the finished socket from the mold.

8. In a machine for molding incandescent-lamp sockets the combination with the mold and opposed die of a duplex die portion having a cylinder the upper end of which forms the inner screw-threaded surface of the socket, with an interior die portion adapted to be rotated on by the cylinder but to travel with the cylinder and having an upper surface which forms the irregular parts of the socket, the inner portion held from rotation but free to reciprocate, the cylinder provided with means for making it rotate when it is reciprocated.

9. In a machine for molding incandescent-lamp sockets the combination with the mold and opposed die of a duplex die portion having a cylinder the upper end of which forms the inner screw-threaded surface of the socket, with an interior die portion adapted to be rotated on by the cylinder but to travel with the cylinder and having an upper surface which forms the irregular parts of the socket, the inner portion held from rotation but free to reciprocate, the cylinder provided with means for making it rotate when it is reciprocated, and an exterior reciprocating cylinder for lifting the finished product from the mold.

CHARLES A. CHASE.

Witnesses:
HOMER L. KRAFT,
EDWARD T. WRAY.